United States Patent [19]

Bielenberg

[11] Patent Number: 5,773,718
[45] Date of Patent: Jun. 30, 1998

US005773718A

[54] DEVICE FOR MEASURING LIQUID VOLUME OF THE CYLINDRICAL PISTON METER TYPE

[76] Inventor: Reiner Bielenberg, Neustr. 60, D 50374 Erftstadt-Gymnich, Germany

[21] Appl. No.: 632,999

[22] Filed: Apr. 16, 1996

[30] Foreign Application Priority Data

Mar. 4, 1996 [EP] European Pat. Off. .............. 96103328

[51] Int. Cl.⁶ ..................................................... C01F 3/08
[52] U.S. Cl. .................................. 73/252; 73/253; 73/257
[58] Field of Search ............................ 73/252, 253, 254, 73/255, 256, 257, 239, 240, 241

[56] References Cited

U.S. PATENT DOCUMENTS

| | | | |
|---|---|---|---|
| 1,460,880 | 7/1923 | Arnaud | 73/252 |
| 2,449,973 | 9/1948 | Bergman | 73/257 |
| 2,561,280 | 7/1951 | Kampf | 73/257 |
| 4,499,764 | 2/1985 | Florina et al. | 73/753 |
| 5,010,767 | 4/1991 | Divisi | 73/753 |
| 5,359,892 | 11/1994 | Felt | 73/257 |
| 5,495,756 | 3/1996 | Robitaille et al. | 73/257 |
| 5,576,489 | 11/1996 | Munck et al. | 73/257 |

FOREIGN PATENT DOCUMENTS

| | | | |
|---|---|---|---|
| 23564 | 7/1935 | Australia | 73/257 |
| 6903 | 9/1914 | France | 73/257 |
| 915475 | 11/1946 | France | 73/257 |
| 66550 | 3/1957 | France | 73/257 |
| 1573082 | 4/1970 | Germany | 73/257 |
| 2622034 | 12/1977 | Germany | 73/257 |
| 2855292 | 11/1979 | Germany | 73/257 |
| 9000958.4 | 1/1990 | Germany . | |
| 4432275 | 9/1994 | Germany . | |
| 404321 | 1/1934 | United Kingdom | 73/257 |
| 587224 | 4/1947 | United Kingdom | 73/257 |
| 738124 | 10/1955 | United Kingdom | 73/257 |
| 1423569 | 2/1976 | United Kingdom . | |

*Primary Examiner*—George M. Dombroske
*Assistant Examiner*—Paul D. Amrozowicz
*Attorney, Agent, or Firm*—Antonelli, Terry, Stout, & Kraus, LLP

[57] ABSTRACT

Device for measuring liquid volume in the manner of a cylindrical piston meter with a cylindrical measuring chamber with connecting channels running perpendicularly to the cylinder axis of the measuring chamber and with a cylindrical piston inserted eccentrically into the measuring chamber and performing a wobbling movement, said piston having an H-shaped cross section and a through opening for engagement into a separating wall projecting into the measuring chamber, with the characterizing feature that the cylindrical piston is hydraulically tensioned by the inflowing liquid in the measuring chamber and the pressure differential on the outer and inner jacket surfaces of the cylindrical piston tends toward zero.

12 Claims, 7 Drawing Sheets

DEVICE FOR MEASURING LIQUID VOLUME OF THE CYLINDRICAL PISTON METER TYPE

FIELD OF THE INVENTION

The invention relates to a device for measuring liquid volume of the cylindrical piston meter type, having a cylindrical measuring chamber provided in a multipartite housing, with a lengthwise cylinder axis (M) and a separating wall projecting radially into the measuring chamber, and through connecting channels connecting the measuring chamber with an exterior of the housing for the liquids to be measured to flow in and out, the channels being designed as through straight bores perpendicular to the cylinder axis (M) of the measuring chamber and running through the cylindrical wall of the housing of the measuring chamber, with the inlet openings of the connecting channels on the measuring chamber side being separated from one another by the separating wall projecting into the measuring chamber and arranged mirrorwise relative to the separating wall, and with an annular piston located eccentrically in the cylindrical measuring chamber with respect to the lengthwise cylinder axis (M), the cylinder performing a wobbling motion and having an H-shaped cross section with upper and lower annular spaces and having a through opening for the engagement of the separating wall projecting into the measuring chamber and subdividing the measuring chamber into an external filling chamber, extending between the wall of the housing delimiting the measuring chamber and the outer jacket surface of the annular piston, and two inner filling chambers surrounded by the annular chambers of the annular piston and delimited from the measuring chamber, and with a movably mounted magnet inside the measuring chamber to generate the measured value.

BACKGROUND OF THE INVENTION

A volume meter of the species according to the invention is known from German patent document DE 44 32 275 C1. In the cylindrical piston meter according to the species for measuring volume, the connecting channels are designed as straight bores perpendicular to the cylinder axis of the cylindrical measuring chamber, so that the incoming liquid to be measured flows into the measuring chamber perpendicularly to the cylinder axis of the measuring chamber and thus impacts the jacket surface of the cylindrical piston that extends in a plane perpendicular to the plane of the incoming liquid.

In contrast to volume meters according to the species, in volume meters according to DE-GM 90 00 958 or GB 1423 569 connecting channels that are curved three-dimensionally and lead into the bottom end of a cylindrical measuring chamber are provided for admitting and discharging liquids, so that different flow relationships are created within the measuring chamber.

In the volume meter according to the species, a more economical manufacture of the housing parts and a measuring accuracy higher than in the demonstrated prior art can be achieved. To produce partial pressure equalization between the interior chambers of the piston and the measuring chamber, it is known that holes and/or smaller recesses can be made in the jacket of the cylindrical piston. The results have not been satisfactory, since major measurement errors occurred, especially at low incoming flowrates, and the cylindrical piston tended to flutter when the liquid contained air.

SUMMARY OF THE INVENTION

A goal of the invention is to improve the volume meter according to the known species both with respect to its economical manufacture and also with respect to the measuring accuracy that can be achieved; in other words reduction of measuring errors, with respect to service life, and with respect to the measurement range, i.e. increasing the measurement range.

This goal is achieved in a device for volume measurement of the cylindrical piston meter type of the type according to the species in that the cylindrical piston has on its jacket, in the inflow direction and in the influx area defined by the entrance openings of the bores into the measuring chamber, recesses for the direct influx and filling of upper and lower annular chambers of the cylindrical piston are provided of such size that the external jacket surface of the cylindrical piston and the internal jacket surface of the cylindrical piston can be impacted uniformly and/or symmetrically with respect to one another by the inflowing liquid, and the pressure differential between the pressures produced by the incoming liquid in the two inner filling chambers in the vicinity of the upper and lower annular chambers of the cylindrical piston and the pressure produced by the incoming fluid in the outer filling chamber of the measuring chamber, tends toward zero.

By virtue of the symmetrical and/or approximately symmetrical influx of the liquid into the cylindrical piston provided according to the invention in such fashion that pressure equalization is permitted between the pressures exerted by the inflowing liquid on the outside of the cylindrical jacket of the piston and on the inside of the cylindrical jacket of the piston, so that the pressure differential tends toward zero or becomes approximately zero, a more uniform and quiet operation of the cylindrical piston is achieved even at low inflow speeds and also when the volume meter starts. It has also been found that even if the inflowing liquid contains air, a more uniform travel of the cylindrical piston is made possible and fluttering thereof is avoided. One consequence of this quiet, uniform operation of the cylindrical piston is a long service life of the device, since striking of the measuring chamber or the measuring chamber wall by the cylindrical piston, as occurs particularly in long-term asymmetrical operation, is avoided, and destruction of the cylindrical piston is likewise avoided.

One important feature of the invention consists in the fact that the cylindrical piston is tensioned hydraulically by the incoming fluid, since the flow direction of the liquid into the measuring chamber is perpendicular to the axis of the cylinder of the measuring chamber, and during filling, i.e. flow of the liquid into the measuring chamber and into the cylindrical piston as well as on both sides of the cylindrical piston, which is located in the cylindrical measuring chamber, the energy of the incoming flow is uniformly distributed by virtue of the design of the cylindrical piston to act equally onto the outer jacket surface and onto the inner jacket surfaces of the cylindrical piston. As a consequence of the uniform distribution of the energy of the incoming flow the pressure produced by the incoming liquid on the outer jacket surface of the cylindrical piston will be equal or become nearly equal to the pressure produced by the incoming liquid on both inner jacket surfaces of the cylindrical piston and therefore the difference of the pressures acting on outside and inside of the cylindrical piston tends to zero.

In another embodiment of the invention, provision is made for the recesses in the jacket of the cylindrical piston to be made so large that when the liquid flows in, a uniform degree of filling in the outer filling chamber can be achieved relative to the degree of filling of the total of the two inner filling chambers of the measuring chamber. The incoming flow is uniformly distributed between the measuring chamber, i.e. the space between the outer jacket of the cylindrical piston and measuring chamber wall, and the upper and lower annular chambers of the piston.

Taking its departure from a cylindrical piston with an H-shaped cross section, in which the jacket projects symmetrically on both sides relative to the middle wall of the piston, it is proposed to make the recesses in the jacket of the cylindrical piston symmetrical with respect to the middle wall of the piston and symmetrical with respect to the through opening of the cylindrical piston and departing from the latter. In particular, provision is made to cut the recesses for the upper and lower annular chambers in the jacket of the cylindrical piston down to the middle wall of the piston in each case, particularly so that the recesses have a rectangular shape in projection. With a rectangular recess that is cut down to the middle wall of the piston in the jacket of the cylindrical piston, the aperture width for each recess is preferably made larger than 0.25 D, where D is the outside diameter of the cylindrical piston, and the aperture width is preferably 5 to 20% greater than 0.25 D.

In order to achieve symmetrical filling and hence the desired pressure equalization within the measuring chambers as the liquid flows through, the inlet openings of the connecting channels at the cylindrical inner measuring chamber wall of the measuring chamber are arranged symmetrically with respect to the cylindrical piston located in the measuring chamber. In this connection, these inlet openings of the connecting channels, projected on the jacket of the cylindrical piston subjected to the flow, are arranged so that the liquid energy of the cylindrical piston is distributed uniformly, especially symmetrically, on the outer jacket area for filling the outer filling chamber and on the two inner filling chambers, i.e. the inner jacket surface of the cylindrical piston.

The invention is based on the knowledge that an essentially error-free measuring curve for a wide measurement range and various influx rates is only possible with pressure equalization, i.e. a cylindrical piston that is free of any pressure differential, and floats or is hydraulically tensioned in the measuring chamber.

For this purpose, in another embodiment of the invention provision is made for the maximum projected influx area on the jacket of the cylindrical piston to be divided into two equal or at least approximately equal influx areas for external impact on the cylindrical piston and for internal impact on the cylindrical piston. The influx area for internal impact on the cylindrical piston is formed by the recesses in the jacket of the cylindrical piston that abut one side of the dividing wall on the top and bottom, and the external influx area for the impact on the cylindrical piston is formed by the jacket and the remaining jacket surface of the middle wall of the piston of the cylindrical piston.

To produce a favorable influx on the cylindrical piston, it is also provided that the diameters of the bores in the connecting channels to the measuring chamber and hence the inlet openings thereof are smaller than the height of the jacket of the cylindrical piston. Preferably, the bores of the connecting channels are formed axially parallel both to one another and to a diametral axis of the measuring chamber, symmetrical mirrorwise to the dividing wall in the measuring chamber, so that the inlet openings of the connecting channels are also arranged symmetrically with respect to the horizontal axis of the cylindrical piston which runs through the plane of the middle wall of the piston relative to the cylindrical piston located in the measuring chamber.

Advantageous embodiments of the volume meter according to the invention are contained in the characterizing features of the subclaims.

For an economic design of the volume meter according to the invention, it is proposed to assemble the housing in three parts, with a cylindrical central part that contains the connecting channels and a cylindrical measuring chamber, and end covers for the middle part with a bottom part and a cover part, with gaskets being inserted between the middle part and the bottom part and/or cover part, and the housing parts being connectable with one another permanently and tightly by screws. In this manner, very precise yet simple and economical manufacture of the measuring chambers of the volume meter is made possible by the three housing parts, with the middle part that receives the cylindrical measuring chamber being capable of being manufactured for example from a section of tubing, with high measurement accuracy.

In a preferred improvement, the cover part and the bottom part are each made with a central guide projection that can fit into the cylindrical measuring chamber of the middle part. The cover part, internally and coaxially with respect to the lengthwise axis of the cylinder, has an annular rib with a guide pin located centrally in the interior, with a surrounding annular space for the engagement of the guide pin of the cylindrical piston remaining between the annular rib and the guide pin. The bottom part has a cylindrical guide base located centrally and coaxially with respect to the lengthwise axis of the cylinder, said base having an annular surface matching the endwise annular surface of the annular rib of the cover, as a supporting surface for the cylindrical piston, so that the cylindrical piston is guided between the annular surface of the cover part and the endwise supporting surface of the guide base of the bottom part with its middle wall of the piston.

The magnet for generating measured values is preferably mounted in the cylindrical piston, in such fashion that the cylindrical piston has a guide pin extending in the upper annular chamber along the lengthwise axis of the piston, said pin being provided with a bore that is a blind hole, starting from the lower annular chamber, and the magnet is inserted into the blind hole and fastened therein with a seal by means of a threaded plug. The magnet is preferably inserted so that the axis of the magnet coincides with the axis of the cylindrical piston.

On the other hand, a magnetic sensor is provided in the part of the housing adjacent to the guide pin of the cylindrical piston, in this case the cover, for which purpose the cover has in its central area a bore in the form of a blind hole that is accessible from the exterior, into which hole the sensor can be inserted. With every revolution of the guide pin of the cylindrical piston with the magnet inserted therein around the guide pin of the measuring chamber, a pulse is generated as a measured value, which is detected by the magnetic sensor and fed to a counting and evaluation device. Both simple pulse counters and electronic field device can be used for this purpose. The number of measured pulses corresponds to a definite quantity and the frequency of the pulses corresponds to a certain through flow. The volume meter according to the invention permits volume measurement of liquids with very high accuracy, with a measurement error of less than 0.5%, preferably less than 0.3%.

In the case of very small volume meters, i.e. with a compact design, only one magnetic sensor is mounted so as to be associated with the magnet in the measuring chamber bottom. In larger volume meters with rated widths of 25 mm or more, two magnetic sensors or even four magnetic sensors uniformly distributed around the guide pin of the measuring chamber are preferably provided, said sensors being sunk into the bottom of the measuring chamber, thus increasing the measuring accuracy.

The volume meter according to the invention has a very long service life because of its extremely quiet operation. By reducing the measurement error it is possible to increase the measurement range of a volume meter, with a measurement range of a volume meter of up to 1:20 being possible. By virtue of the fact that the measurement error is nearly zero, even during the starting of a cylindrical piston meter, especially with very low starting speeds of the cylindrical piston, it is possible with the volume meter according to the invention to measure even very small, i.e. small liquid flows and especially leakage flows as well, and to measure them. By virtue of the design of the volume meter according to the invention, with a hydraulically tensioned cylindrical piston and pressure equalization of the filling volumes in the measuring chamber, the cylindrical piston will move in response to even very small liquid flows, such as leak flows, so that it can detect these and display them. As a result, protection against leakage is improved in lines that carry liquids by the possibility of detecting them by means of the volume meter according to the invention.

The invention makes it possible to connect the mounting flange for the incoming and outgoing liquids in simple fashion to the outlet openings of the bores on the outside wall of the middle part of the housing that comprises the measuring chamber. In particular, it is proposed to provide a flat connecting surface externally on the middle part in the area surrounding the outlet openings of the bores. It is then possible to screw the flange in a module, coupled by means of a connector for example, over the flat connecting surface with interposition of gaskets. Accordingly, it is also possible to uncouple the volume meter with no difficulty from the connecting lines, for maintenance for example.

BRIEF DESCRIPTION OF THE DRAWINGS

The invention will be described in the drawing in further detail with reference to an embodiment.

DETAILED DESCRIPTION OF THE INVENTION

FIGS. 1 to 4 show a design according to the invention of a housing for a volume meter for measuring the volume of liquids in the manner of a cylindrical piston meter according to the invention. The housing of the cylindrical piston meter surrounding a cylindrical piston is composed of cylindrical middle part 2 with a cylindrical interior chamber, delimited by cylindrical measuring chamber wall 601, as well as cover 5 and bottom part 8 which seal ends 215 and 214 respectively of the middle part. In ends 214 and 215 of middle part 2, near cylindrical inside wall 601, annular grooves 213 and 213*a* are provided for inserting gaskets. In bottom part 8, middle part 2, and cover 5, and also in the bottom part but not shown in greater detail, through bores 501 and 216 are provided through which screws, not shown in greater detail, are guided in order to connect housing parts 5, 2, and 8 tightly and permanently together, and to form measuring chamber 6 inside the housing. The connecting channels for measuring chamber 6 are made as through straight bores 3*a*, 3*b* in a plane perpendicular to lengthwise cylinder axis M through cylindrical middle part 2. The cylindrical middle part for the measuring chamber can be manufactured with high precision from a steel tube.

On the outer connecting side of the bores, at openings 13, 14 of connecting channels 3*a*, 3*b*, cylindrical middle part 2 is flattened to form the plane connecting surface 212. This permits a simpler and more reliable connection for the liquids to be introduced into and removed from the measuring chamber by means of connectors and tube connections; see FIG. 7.

Figure 1:
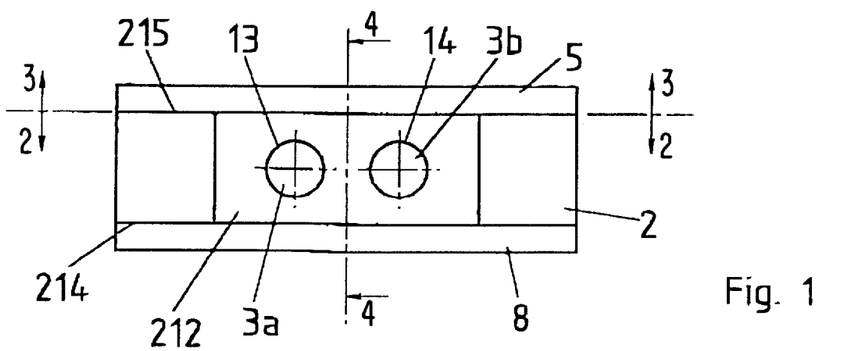
FIG. 1 is a view of the connecting side of a housing of a cylindrical piston meter according to the invention.
Figure 2:
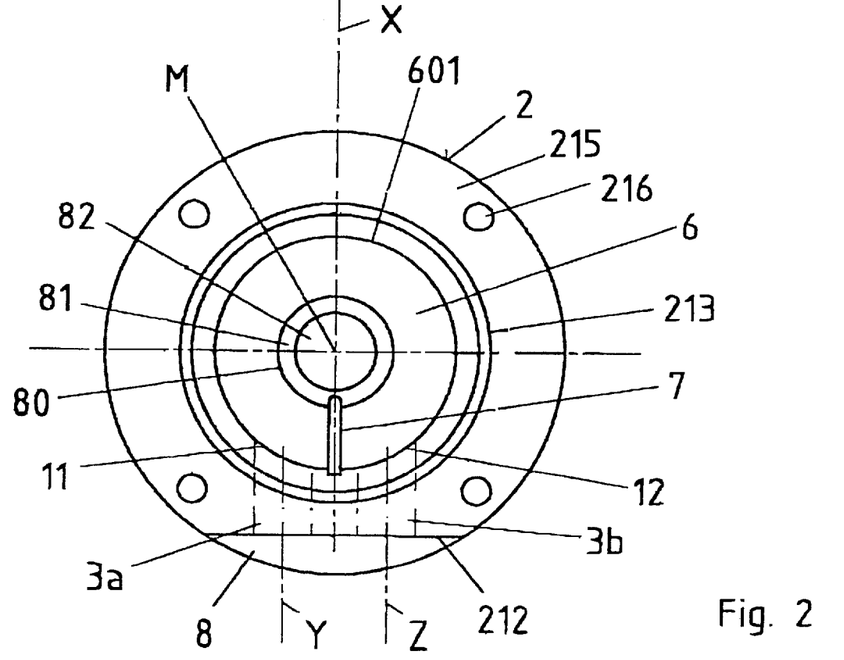
FIG. 2 is a top view AA looking down on the housing in FIG. 1 without a cover.

FIG. 2 shows a top view of cylindrical measuring chamber 6 surrounded by middle part 2. The end of the middle part is separated from bottom part 8, which has a central and coaxially guided projection 84, by which it is fitted into measuring chamber 6; see FIG. 4. Guide base 80 is formed on guide projection 84, centrally and coaxially with respect to cylinder axis M of measuring chamber 6, said base being provided endwise with an annular supporting surface 81 for a cylindrical piston and having a flat central recess 82; see FIGS. 2 and 4. The measuring chamber is divided at one point by means of a dividing wall 7 that extends both perpendicularly, i.e. for the height of the measuring chamber, and radially from cylindrical inside wall 601 toward the middle. Separating wall 7 ends at guide base 80, which is formed centrally on bottom part 8 and projects into the measuring chamber. The diametral axis of measuring chamber 6 that extends through separating wall 7 is marked X; it extends perpendicularly with respect to lengthwise cylinder axis M of the measuring chamber. The separating wall is inserted removably for maintenance. On both sides of separating wall 7, connecting channels 3*a*, 3*b* are provided mirrorwise with respect to diametral axis X for the entrance and exit of the liquid to be measured and leading into measuring chamber 6, and made as through cylindrical bores. These bores 3*a*, 3*b*, cut through the cylindrical wall of housing 2, with their axes Y and Z, respectively, being preferably arranged axially parallel to one another and similarly axially parallel to the diametral axis X. Inlet openings 11 and 12 of bores 3*a* and 3*b*, respectively, are located on cylindrical inside wall 601 of the measuring chamber. Through bores 3*a*, 3*b*, an inward or impacting flow inward of liquid into measuring chamber 6 is made possible in a plane perpendicular to lengthwise cylinder axis M.

Figure 3:
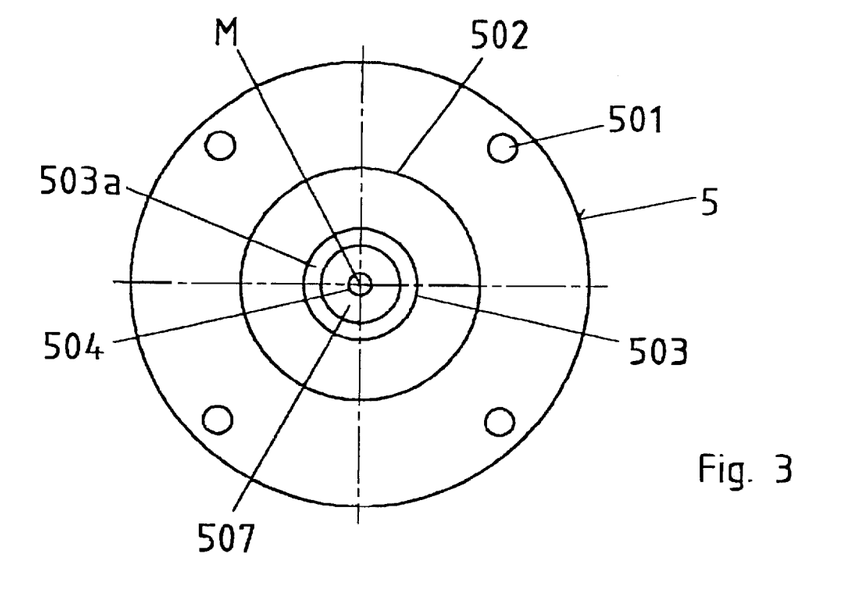
FIG. 3 is a top view BB according to FIG. 1, looking at the cover from the inside.

As the view in FIG. 3 shows, cover 5 has on its interior a cylindrical guide pin 502, by which it can be inserted to fit exactly into cylindrical measuring chamber 6 of housing middle part 2. On guide pin 502, projecting endwise into the measuring chamber, a projecting annular rib 503 is formed centrally, as well as a centrally located small guide pin 504, with an annular chamber 507 being located between annular rib 503 and guide pin 504, said chamber serving to receive a guide pin of the cylindrical piston inserted into the measuring chamber. On the outer upper side of cover 5, see FIG. 4, a bore 505 in the form of a blind hole located slightly eccentrically is provided to receive a magnetic sensor. A plurality of blind holes can also be provided in large volume meters for a plurality of sensors.

Figure 4:
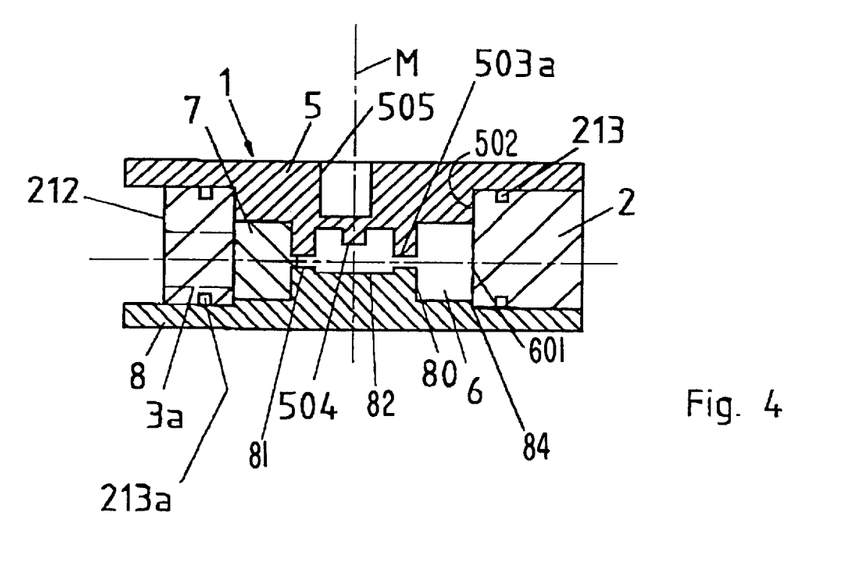
FIG. 4 is a section CC according to FIG. 1, rotated by 90 degrees.
Figure 6:
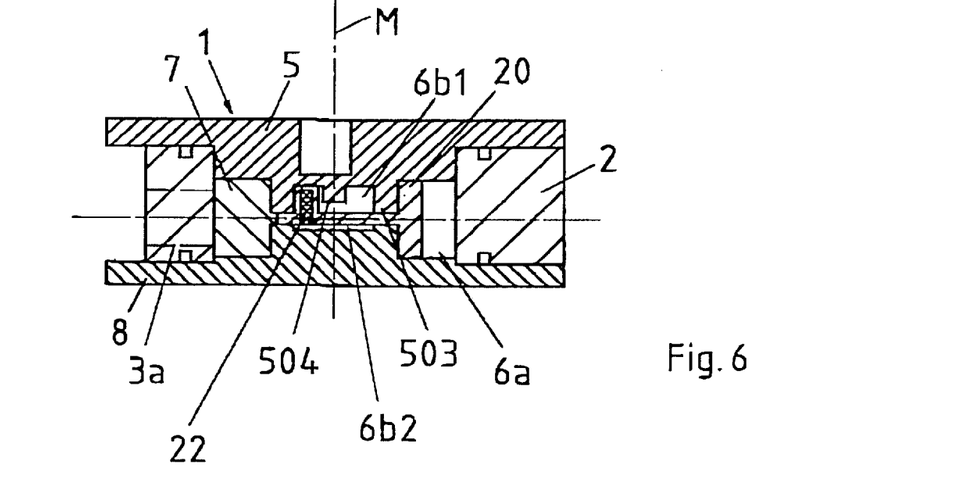
FIG. 6 is a section DD according to FIG. 5, rotated by 90 degrees.

As can be seen from the section according to FIG. 4 of housing parts 2, 4, 8 surrounding measuring chamber 6, the outside diameter of projecting annular rib 503 molded on cover 5 as well as the outside diameter of cylindrical guide base 80 of bottom part 8 are made the same in order to form contact surfaces for the moveable cylindrical piston. Between end 503a of annular rib 503 of the cover and end 81 of the guide base, a gap is left for the insertion of the cylindrical piston with its piston middle wall, as shown in FIG. 6.

The size of measuring chamber 6 is then determined firstly by cylindrical inside wall 601 of middle part 2 of the housing and secondly by the design of the interiors of cover 5 and bottom part 8 that project into the measuring chamber.

Housing parts 2, 5, 8 as well as the separating wall can be made for example of a corrosion-proof material, especially a suitable metal alloy or a cast alloy.

Figure 7:
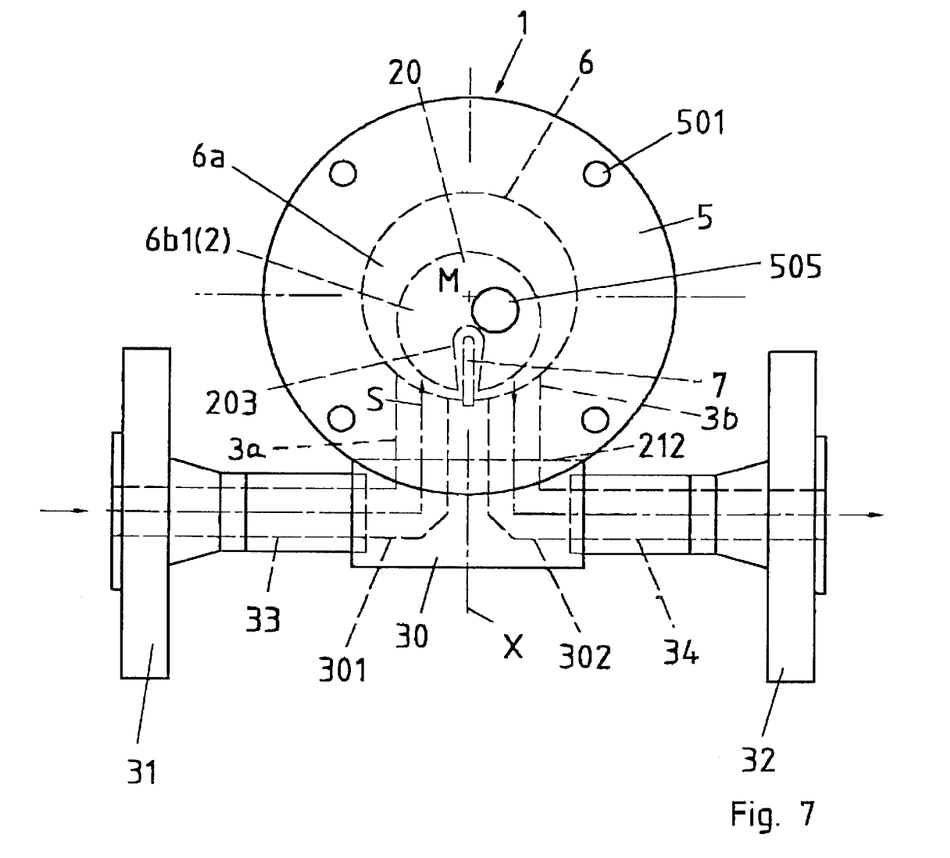
FIG. 7 is a top view looking at a cylindrical piston meter on the cover side, with a connector and connecting flanges.

In FIG. 7, in a top view, the volume meter designed as a cylindrical piston meter is shown and the cylindrical measuring chamber 6 with cylindrical piston 20 inserted eccentrically is shown schematically. Cylindrical piston 20 here has a through opening 203 designed as a slot, into which separating wall 7, inserted replaceably into measuring chamber 6, fits. Cylindrical piston 20 with an outside diameter smaller than the inside diameter of the measuring chamber is inserted eccentrically with respect to lengthwise cylinder axis M of the measuring chamber and divides measuring chamber 6 into three filling chambers, namely outer filling chamber 6a between the inside wall of the measuring chamber and the outer jacket surface of the cylindrical piston and the two inner filling chambers 6b1 and 6b2 formed by the upper and lower annular chambers of cylindrical piston 20 with respect to the measuring chamber walls of cover 5 and bottom part 8.

As can be seen in the top view in FIG. 7, the through flow opening 203 of cylindrical piston 20 is made drop-shaped and permits cylindrical piston 20 inserted eccentrically into the measuring chamber to perform a wobbling movement.

At connecting surface 212, a connecting piece 30 with bores 301, 302 to allow the liquid to be measured to flow in and out is connected to connecting channels 3a, 3b, for example by screwing with interposition of gaskets. Connecting piece 30 in turn is equipped on the outlet sides of bores 301, 302 with flanges 31 and 32, with influx channels 33, 34 for connection to additional side connections.

As can be seen from the combination of FIGS. 1 to 4, bores 3a, 3b for liquid to flow in and out of measuring chamber 6 are made with a diameter only slightly smaller than the height of cylindrical measuring chamber 6. Bores 3a, 3b are also made symmetrical with respect to cylinder axis M at housing middle part 2. By virtue of this arrangement and the design of bores 3a, 3b in cylindrical middle part 2, the flow of the liquid in and out of the measuring chamber, as indicated by the arrows, takes place in an inflow direction S parallel to separating wall 7; see FIG. 7. In this manner, unnecessary flow deflection is avoided and the pressure loss is reduced as liquid flows in and out in measuring chamber 6. In the volume meter according to FIG. 7, the liquid flows into the measuring chamber via bore 3a and flows out of the measuring chamber via bore 3b. The direction of flow can be changed.

Figure 5:
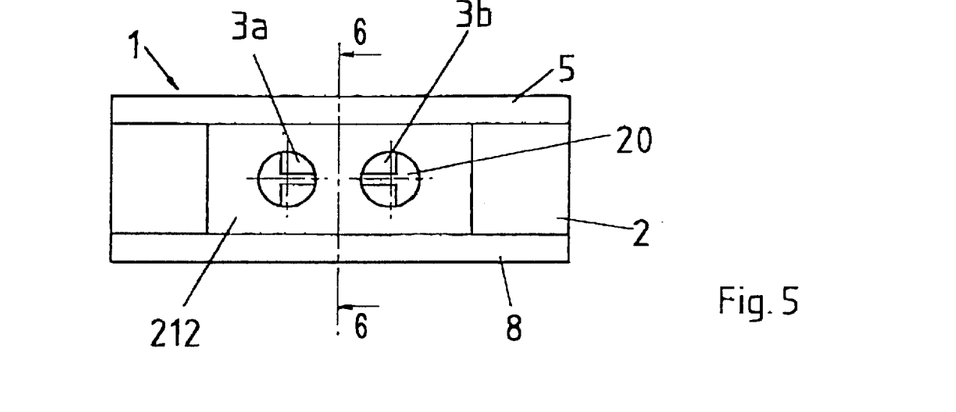
FIG. 5 is a view of the connecting side of the cylindrical piston meter according to FIG. 1 with the cylindrical piston inserted.

FIG. 5 shows a view of cylindrical piston meter 1 according to FIG. 1 with cylindrical piston 20 inserted. Cylindrical piston 20 in this case, as can also be seen from the top view in FIG. 7 looking down on the cylindrical piston meter, is located symmetrically in the measuring chamber and relative to connecting channels 3a, 3b in the measuring chamber that form the inlet openings into the measuring chamber, with this arrangement relating to the zero position as shown in FIG. 7.

Figure 8:
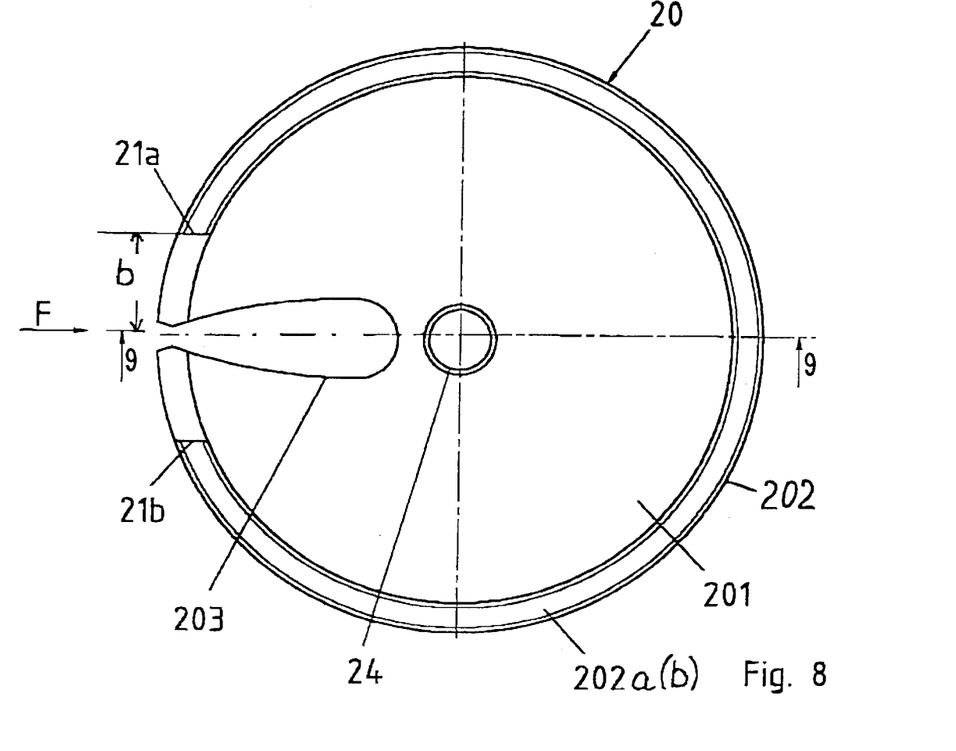
FIG. 8 is a top view of the cylindrical piston for the cylindrical piston meter according to FIGS. 5 to 7 in an enlarged representation.
Figure 9:
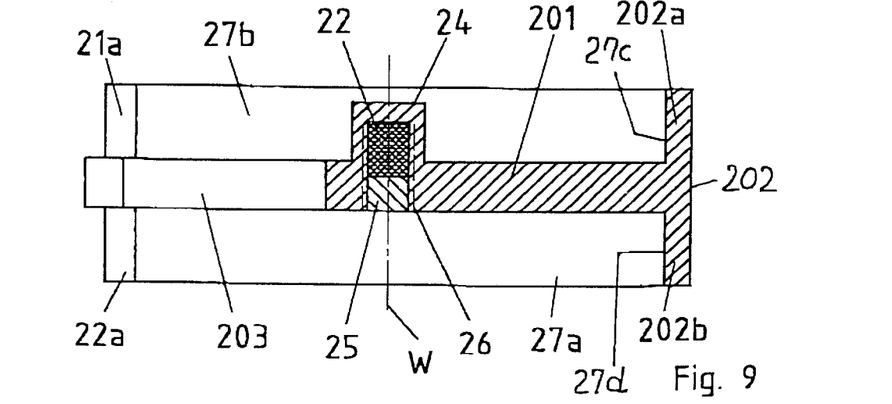
FIG. 9 is a section EE through cylindrical piston in FIG. 8.
Figure 10:
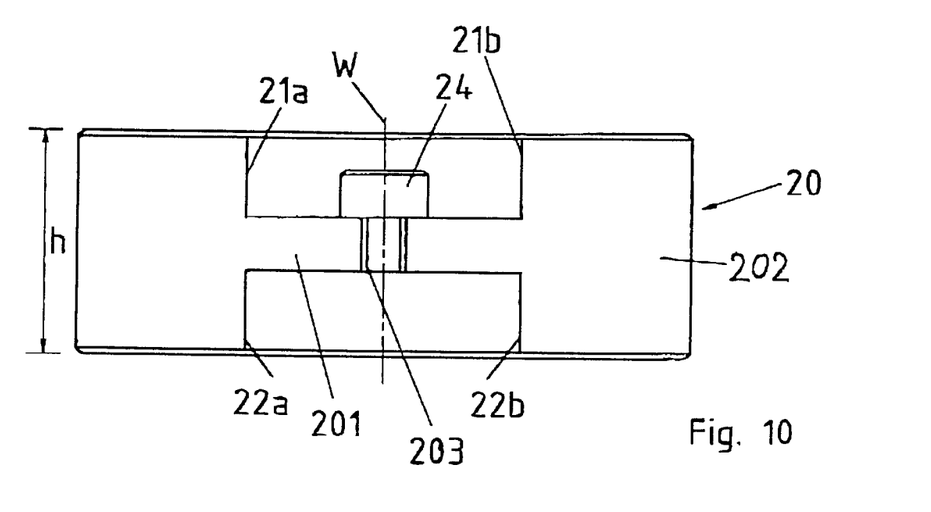
FIG. 10 is a view F of the cylindrical piston according to FIG. 8.

The cylindrical piston to be inserted into the measuring chamber is shown in an embodiment in FIGS. 8, 9, and 10 in an enlarged form for example, and will be described in greater detail below with reference thereto. Cylindrical piston 20 is made, for example, from a suitable corrosion-resistant plastic such as polytetrafluoroethylene or ethylene-chlorotrifluoroethylene copolymer or polyfluoroethylenepropylene, and when viewed in cross section has an H-shaped form; see FIG. 9. Cylindrical piston 20 comprises central piston middle wall 201 in the form of a circular disk with a jacket or casing projecting uniformly to both sides in the form of collars 202a, 202b. The axis of the cylindrical piston is marked W. Above and below piston middle wall 201, upper annular chamber 27b and lower annular chamber 27a are formed, delimited by inner jacket surfaces 27c and 27d respectively. The jacket of the piston externally forms jacket surface 202. Cylindrical piston 20 also has, located centrally and coaxially with respect to cylindrical piston axis W, a guide pin 24 projecting into the upper annular chamber, said pin containing a bore 26 in the form of a blind hole that starts in lower annular chamber 27a, in other words the opposite side. Magnet 22 is inserted into bore 26 in the form of a blind hole and held in place by a threaded plug 25. The threaded plug is also sealed by a sealing material so that no liquid can penetrate from the annular chambers to the magnet. Cylindrical piston 20 also has in middle wall 201 of the piston, a drop-shaped to elongated-oval through opening 203 running radially from the jacket side to a point close to the middle; see FIGS. 8 and 9. The radial length of this through opening 203 is dimensioned so that when cylindrical piston 20 is inserted into the measuring chamber, as shown in FIG. 7, separating wall 7 engages it through opening 203. In the area where through opening 203 passes through jacket 202, i.e. collar parts 202a, 202b, the jacket of cylindrical piston 20 is formed with recesses 21a, 21b and 22a, 22b extending from through opening 203 up to cylinder middle wall 201. Recesses 21a, 21b constitute large openings to connect the upper annular chamber with the exterior, and recesses 22a, 22b constitute openings to connect lower annular chamber 27a with the exterior. In the view looking at jacket surface 202 of the cylindrical piston, as shown in FIG. 10, it is evident that the recesses in the jacket have an essentially rectangular form when projected. In addition, the outer jacket surface of the cylindrical piston can be made with fine grooves parallel to the axis W of the cylindrical piston, so that any particles that may be contained in the liquids to be measured cannot adhere.

Jacket 202 of cylindrical piston 20 has a height h, and the opening width of a recess 21a or 21b or 22a, 22b is marked b. The four recesses 21a, 21b, 22a, 22b are arranged symmetrically and so formed with respect to through opening 203 of cylindrical piston 20 on the cylindrical piston.

It is clear from FIGS. 5, 6 and 7 that cylindrical piston 20 with its cylindrical piston axis W is inserted eccentrically but axially parallel to cylinder axis M into measuring chamber 6. Guide pin 24 of cylindrical piston 20, fitted with magnet 22, engages annular groove 507 of the cover and is guided therein, so that during the wobbling movement of cylindrical piston 20, because of the inflowing liquid, it performs a circular movement as the circular path around guide pin 504 of the cover of the measuring chamber. Each revolution is then recorded by the magnetic sensor(s) located in blind hole 505 in cover 5 or in additional blind holes, and is transmitted as a pulse to an evaluation unit.

As can be seen from FIG. 6, the cylindrical piston is inserted with its piston middle wall 201 between annular rib 503 of the cover and guide base 80 of the bottom part, so that measuring chamber 6 is divided into three filling chambers, namely outer filling chamber 6a between outer jacket surface 202 of cylindrical piston 20 and the cylindrical inside wall of middle part 2 of the housing that delimits the measuring chamber, filling chamber 6b1 between the cover and the cylinder middle wall in the vicinity of upper annular chamber 27b, and the additional lower internal filling chamber 6b2 between bottom part 8 and piston middle wall 201, including lower annular chamber 27a.

The operation of the cylindrical piston meter according to the invention is essentially as follows: liquid whose volume is to be measured enters for example through connecting piece 31, as shown in FIG. 7, and bore 3a into measuring chamber 6. Then it flows parallel in the direction of arrow S to dividing wall 7 into the measuring chamber where it strikes jacket 202 of the cylindrical piston in a plane perpendicular to lengthwise axis W of the piston. As shown in the schematic diagram of the inflow conditions according to FIG. 12, the volume of liquid flowing in direction S strikes not only outer jacket 202 of cylindrical piston 20 in the vicinity of the influx, but also recesses 21a, 22a for upper and lower annular chambers 27b, 27a, (see also details in FIGS. 8, 9 and 10). The incoming fluid stream is then divided, as shown schematically in FIG. 12, into a part formed in outer filling chamber 6a between measuring chamber wall 601 and the outer jacket surface of the cylindrical piston and into two additional partial streams that flow into the upper and lower annular chambers of cylindrical piston 20 in the vicinity of recesses 21a, 22a.

Depending on the inflow, volume, and throughput, the cylindrical piston, because of this inflow and the energy of said inflow, performs a wobbling circling movement limited on the one hand by dividing wall 7 with through opening 23 of the cylindrical piston and also guided by guide pin 24 of the cylindrical piston within annular rib 503 of the cover of the measuring chamber. The liquid passes through the various filling chambers 6a, 6b1, 6b2 of the measuring chamber back to bore 3b, i.e. to the other inlet opening 12 of the second connecting channel, through which it can flow out in the direction of arrow S1, and then through connecting stub 32; see FIG. 7.

The invention is based on the discovery that an essentially error-free measuring curve is possible for a large range of volumes to be measured and various inflow speeds only with pressure equalization, i.e. a cylindrical piston 20 floating in measuring chamber 6 and free of a pressure differential, or hydraulically tensioned.

Figure 11:
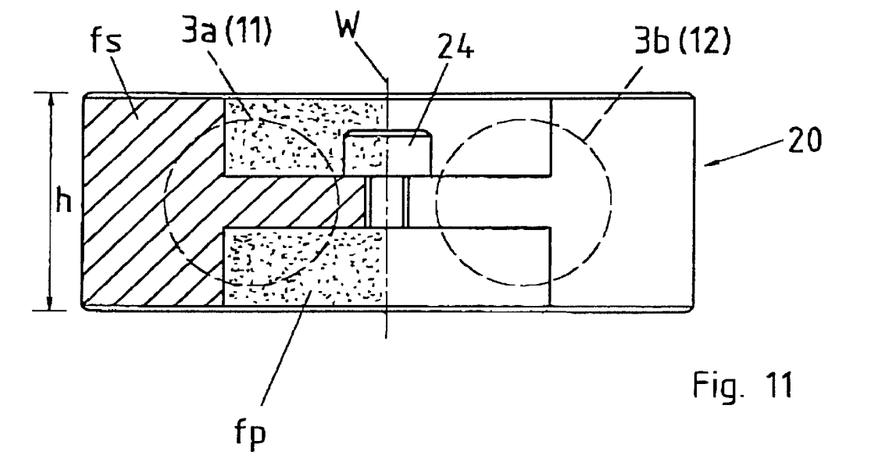
FIG. 11 is a view of the cylindrical piston according to FIG. 10 with the surfaces subject to flow being indicated.
Figure 12:
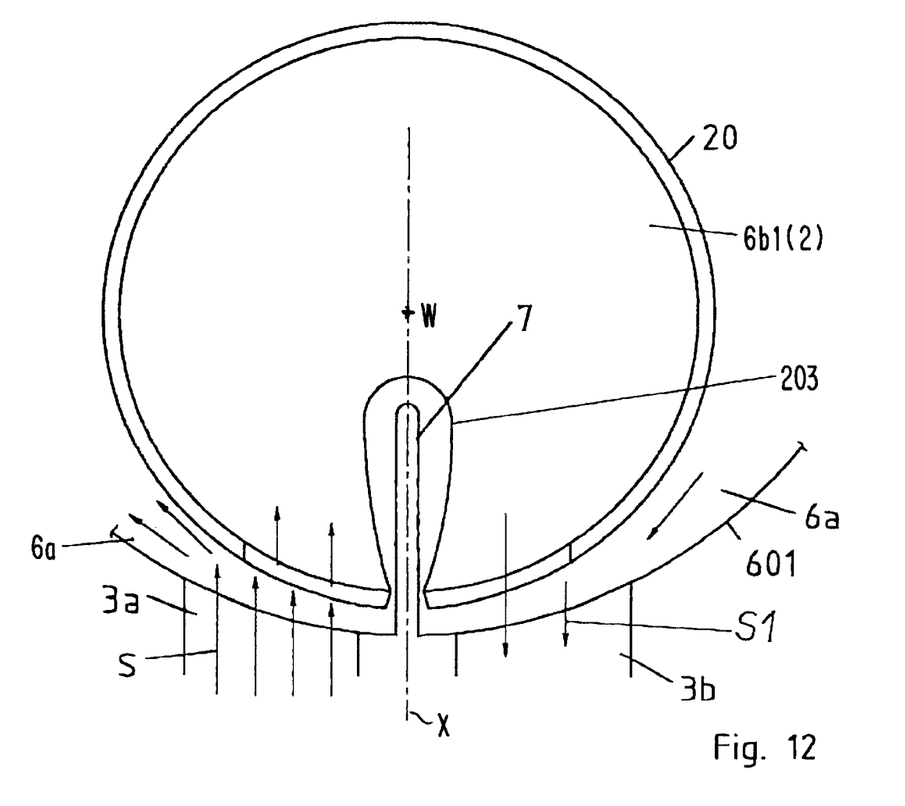
FIG. 12 is a schematic top view of the cylindrical measuring chamber showing the cylindrical piston inserted and the inflow relationships.

For this purpose, provision is made in another embodiment of the invention, as shown in FIGS. 11 and 12, that the maximum projected inflow area of jacket 202 of cylindrical piston 20 is divided into two equal or at least approximately equal inflow areas fs for external impact on the cylindrical piston and fp for internal impact on the cylindrical piston. The inflow area for internal impact on the cylindrical piston is formed by recesses 21a, 22a connecting respectively above and below on one side of dividing wall 7 in jacket 202 of cylindrical piston 20, and the external inflow surface for impact on the cylindrical piston is formed by the jacket and the remaining jacket surface of the cylinder middle wall 201 of the cylindrical piston, viewed in a projection.

The projected inflow area is formed by a quarter of a circle of the jacket of the cylindrical piston. In the view shown in FIGS. 11 and 12 the zero position as shown serves as the basis. As can be seen in FIG. 12 in connection with FIG. 11, inlet opening 11, when the second connecting channel with its inlet opening then forms the outlet, is located symmetrically with respect to the projection of the cylindrical piston, i.e. with respect to its vertical axis W, and also with respect to its horizontal axis of symmetry extended through the cylinder middle wall and with respect to through opening 203 of the cylindrical piston guided separating wall 7 and located symmetrically in the measuring chamber wall; see FIG. 11. The height h of the jacket of cylindrical piston 20 is slightly larger than the diameter of connecting channels 3a, 3b. In order to ensure as uniform an impact as possible on both outer filling chamber 6a and the sum of the two inner filing chambers 6b1, 6b2, recesses 21a, 21b, 22a, 22b preferably have a width b, as shown in FIG. 8, that is slightly larger than 0.25 D, where D is the outside diameter of cylindrical piston 20. Inlet openings 11, 12 of the connecting channels for the liquid to be measured, as can be seen from FIG. 11, are then so arranged with respect to cylindrical piston 12 and its recesses in the vicinity of the through opening that a distribution of the inflow energy in outer filling chamber 6a and the two inner filling chambers 6b1, 6b2 that is as symmetrical as possible can occur. During filling, as shown in FIG. 12, the inflow energy is then uniformly divided so that a uniform degree of filling is obtained outside and inside the cylindrical piston is achieved and the pressure differential between outer filling chamber 6a and inner filling chambers 6b1, 6b2 tends toward zero or becomes zero, so that the cylindrical piston floats free of a pressure differential and is hydraulically tensioned, and is specifically tensioned horizontally, hydraulically. In this manner it is possible for the cylindrical piston, even with low inflow rates and also with changing throughputs and even in the case of liquids containing air, to run very uniformly and quietly and not to flutter or rattle. It is therefore important for working the invention that the arrangement of inlet openings 11, 12 of the connecting channels for the inflow and outflow of liquids into the measuring chamber as well as the arrangement of the cylindrical piston as well as its recess to impact the cylindrical piston be selected internally and externally in such fashion that an inflow to the cylindrical piston that is as uniform and symmetrical as possible is enabled both externally and internally, with a pressure equalization taking place between the inner and outer measuring chambers, i.e. the inner and outer filling chambers. In particular, the design of the recesses in the jacket of the cylindrical piston for simple inflow of one part of the liquid into the inner annular chambers of the cylindrical piston is designed so that a parallel inflow is made possible, as shown in FIG. 12. Even when cylindrical piston 20 is performing a wobbling movement as the liquid flows through, the relationships of surfaces fs and fp subjected to the inflow are changed slightly, but in general this division retains nearly the desired and effected symmetry so that optimum operation of the cylindrical piston can be achieved.

What is claimed is:

1. A device for measuring liquid volume, comprising a multipartite housing defining a cylindrical measuring chamber with a lengthwise cylinder axis (M) and including a dividing wall projecting radially into the cylindrical measuring chamber, and two connecting channels for allowing liquids to be measured to flow into and out of the cylindrical measuring chamber, said connecting channels comprising straight bores passing through the housing into the cylindrical measuring chamber perpendicular to the lengthwise cylinder axis (M) of the cylindrical measuring chamber, the connecting channels having inlet openings to the cylindrical measuring chamber divided from one another by the dividing wall projecting into the cylindrical measuring chamber, said inlet openings being arranged mirrorwise relative to the dividing wall; a cylindrical piston located eccentrically in the cylindrical measuring chamber with respect to the lengthwise cylinder axis (M) so as to perform a wobbling movement, said cylindrical piston having an H-shaped cross section forming a jacket having an outer jacket surface and a piston middle wall, thereby forming an upper and a lower annular chamber with inside jacket surfaces, the cylindrical piston having a through opening for engagement of the dividing wall projecting into the measuring chamber and dividing the measuring chamber into an outer filling chamber extending between the multipartite housing that delimits the cylindrical measuring chamber and the outer jacket surface of the cylindrical piston, and two inner filling chambers, the two inner filling chambers comprising the upper and lower annular chambers of the cylindrical piston and being delimited from the cylindrical measuring chamber, the jacket having recesses therein extending symmetrically from the piston middle wall and symmetrically from the through opening of the cylindrical piston to expose the upper and lower annular chambers; and a magnet movably mounted inside the cylindrical measuring chamber for generating a measured value of liquid volume, wherein said recesses are associated to the inlet openings of the connecting channels and have such a size that an incoming volume of liquid flowing through the connecting channels and inlet openings into the measuring chamber strikes the outer jacket surface of the cylindrical piston and the said recesses exposing the upper and lower annular chambers, thereby dividing the incoming volume of liuqid into a part flowing in the outer chamber and into two parts flowing into the inner filling chambers comprising the upper and annular chambers of the cylindrical piston, whereby the outer jacket surface of the cylindrical piston and inside jacket surfaces of the cylindrical piston relative to one another can be impacted uniformly or symmetrically by the incoming volume of liquid, and the pressure differential between the pressure produced in the two inner filling chambers in the vicinity of the upper and lower annular chambers of the cylindrical piston with respect to the pressure produced by the incoming volume of liquid in the outer filling chamber of the cylindrical measuring chamber tends toward zero, wherein the recesses are made so large that with the incoming volume of liquid in one of the connecting channels, a uniform degree of filling of the outer filling chamber relative to the sum of the two inner filling chambers can be achieved in the area of the cylindrical piston.

2. A device according to claim 1, wherein the cylindrical piston, with the incoming volume of liquid, is tensioned hydraulically in the cylindrical measuring chamber.

3. A device according to claim 1, wherein a diameter of the connecting channels is smaller than a height of the jacket of the cylindrical piston.

4. A device according to claim 1 wherein inlet openings are arranged symmetrically with respect to the cylindrical piston provided in the cylindrical measuring chamber.

5. A device according to claim 1, wherein the cylindrical piston has a guide pin extending in a lengthwise axis (W) of the piston in the upper annular chamber, said pin being provided with a bore in the form of a blind hole starting from the lower annular chamber, and wherein the magnet for generating the measured value of liquid volume is inserted into the blind hold and fastened therein with a seal by means of a threaded plug.

6. A device according to claim 5, wherein the multipartite housing comprises three parts composed of a cylindrical middle part through which are provided the connecting channels and defining an outer periphery of the cylindrical measuring chamber, a bottom part and a cover, wherein gaskets are provided between the cylindrical middle part and the bottom part and between the cylindrical middle part and the cover, and wherein the three parts are connected permanently and tightly with one another by screws.

7. A device according to claim 6, wherein the cover and bottom part each have a guide projection inserted with an exact fit into cylindrical measuring chamber of the cylindrical middle part, and the cover has an annular rib located internally coaxially with respect to the lengthwise cylinder axis (M), with a guide pin located centrally in the interior, with a circumferential annular chamber for the engagement of the guide pin of the cylindrical piston remaining between the annular rib and the guide pin of the cover, and wherein the bottom part has a cylindrical guide base located centrally and coaxially with respect to the lengthwise cylinder axis (M), said guide base having an outside diameter that matches an outside diameter of the annular rib of the cover and having a matching annular end surface as a supporting surface for the cylindrical piston corresponding to an endwise annular surface of annular rib of the cover, so that the circular piston is guided between the annular surface of the cover and the annular end surface of the guide base of the bottom part with its piston middle wall.

8. A device according to claim 7, wherein at least one bore in the form of a blind hole is provided in the cover in a central area, said blind hole being accessible from the exterior, into which blind hole a magnetic sensor is insertable, whereby the magnetic sensor and the magnet provided in the cylindrical piston, with each revolution of the guide pin of the cylindrical piston around the guide pin formed in the cover, generate an impulse as a measured value that can be fed to a counting and evaluation unit.

9. A device according to claim 6 wherein a flat connecting surface is formed on an outside of the cylindrical middle part of the multipartite housing in an area surrounding outlet openings of the connecting channels over an entire height of the cylindrical middle part.

10. A device for measuring liquid volume, comprising a multipartite housing defining a cylindrical measuring chamber with a lengthwise cylinder axis (M) and including a dividing wall projecting radially into the cylindrical measuring chamber, and two connecting channels for allowing liquids to be measured to flow into and out of the cylindrical measuring chamber, said connecting channels comprising straight bores passing through the housing into the cylindrical measuring chamber perpendicular to the lengthwise cylinder axis (M) of the cylindrical measuring chamber, the connecting channels having inlet openings to the cylindrical measuring chamber divided from one another by the dividing wall projecting into the cylindrical measuring chamber, said inlet openings being arranged mirrorwise relative to the dividing wall; a cylindrical piston located eccentrically in the cylindrical measuring chamber with respect to the lengthwise cylinder axis (M) so as to perform a wobbling movement, said cylindrical piston having an H-shaped cross section forming a jacket having an outer jacket surface and a piston middle wall, thereby forming an upper and a lower annular chamber with inside jacket surfaces, the cylindrical piston having a through opening for engagement of the dividing wall projecting into the measuring chamber and dividing the measuring chamber into an outer filling chamber extending between the multipartite housing that delimits the cylindrical measuring chamber and the outer jacket surface of the cylindrical piston, and two inner filling chambers, the two inner filling chambers comprising the upper and lower annular chambers of the cylindrical piston and being delimited from the cylindrical measuring chamber, the jacket having recesses therein extending symmetrically from the piston middle wall and symmetrically from the through opening of the cylindrical piston to expose the upper and lower annular chambers; and a magnet movably mounted inside the cylindrical measuring chamber for generating a measured value of liquid volume, wherein said recesses are associated to the inlet openings of the connecting channels and have such a size that an incoming volume of liquid flowing through the connecting channels and inlet openings into the measuring chamber strikes the outer jacket surface of the cylindrical piston and the said recesses exposing the upper and lower annular chambers, thereby dividing the incoming volume of liuqid into a part flowing in the outer chamber and into two parts flowing into the inner filling chambers comprising the upper and annular chambers of the cylindrical piston, whereby the outer jacket surface of the cylindrical piston and inside jacket surfaces of the cylindrical piston relative to one another can be impacted uniformly or symmetrically by the incoming volume of liuqid, and the pressure differential between the pressure produced in the two inner filling chambers in the vicinity of the upper and lower annular chambers of the cylindrical piston with respect to the pressure produced by the incoming volume of liquid in the outer filling chamber of the cylindrical measuring chamber tends toward zero, wherein the recesses of the jacket of the cylindrical piston, viewed in projection, have a rectangular shape and, wherein an opening width (b) of each recess is larger than 0.25 D, wherein D is an outside diameter of cylindrical piston.

11. A device according to claim 10, wherein the opening width (b) of each recess is 5 to 20% greater than 0.25 D.

12. A device for measuring liquid volume, comprising a multipartite housing defining a cylindrical measuring chamber with a lengthwise cylinder axis (M) and including a dividing wall projecting radially into the cylindrical measuring chamber, and two connecting channels for allowing liquids to be measured to flow into and out of the cylindrical measuring chamber, said connecting channels comprising straight bores passing through the housing into the cylindrical measuring chamber perpendicular to the lengthwise cylinder axis (M) of the cylindrical measuring chamber, the connecting channels having inlet openings to the cylindrical measuring chamber divided from one another by the dividing wall projecting into the cylindrical measuring chamber, said inlet openings being arranged mirrorwise relative to the dividing wall; a cylindrical piston located eccentrically in the cylindrical measuring chamber with respect to the lengthwise cylinder axis (M) so as to perform a wobbling movement, said cylindrical piston having an H-shaped cross section forming a jacket having an outer jacket surface and a piston middle wall, thereby forming an upper and a lower annular chamber with inside jacket surfaces, the cylindrical piston having a through opening for engagement of the dividing wall projecting into the measuring chamber and dividing the measuring chamber into an outer filling chamber extending between the multipartite housing that delimits the cylindrical measuring chamber and the outer jacket surface of the cylindrical piston, and two inner filling chambers, the two inner filling chambers comprising the upper and lower annular chambers of the cylindrical piston and being delimited from the cylindrical measuring chamber, the jacket having recesses therein extending symmetrically from the piston middle wall and symmetrically from the through opening of the cylindrical piston to expose the upper and lower annular chambers; and a magnet movably mounted inside the cylindrical measuring chamber for generating a measured value of liquid volume, wherein said recesses are associated to the inlet openings of the connecting channels and have such a size that an incoming volume of liquid flowing through the connecting channels and inlet openings into the measuring chamber strikes the outer jacket surface of the cylindrical piston and the said recesses exposing the upper and lower annular chambers, thereby dividing the incoming volume of liuqid into a part flowing in the outer chamber and into two parts flowing into the inner filling chambers comprising the upper and annular chambers of the cylindrical piston, whereby the outer jacket surface of the cylindrical piston and inside jacket surfaces of the cylindrical piston relative to one another can be impacted uniformly or symmetrically by the incoming volume of liuqid, and the pressure differential between the pressure produced in the two inner filling chambers in the vicinity of the upper and lower annular chambers of the cylindrical piston with respect to the pressure produced by the incoming volume of liquid in the outer filling chamber of the cylindrical measuring chamber tends toward zero, wherein a maximum projected inflow area of the jacket, associated with an inlet opening of a connecting channel, is divided into two at least approximately equal inflow areas for external impact on the cylindrical piston and for internal impact on the cylindrical piston, with inflow area for internal impact on the cylindrical piston being formed by the recesses in the jacket of the cylindrical piston abutting one side of the through opening for engaging the dividing wall at top and bottom portions respectively of the piston middle wall, and external inflow area of the jacket for external impact on the outer jacket surface and on a residual jacket surface of the cylindrical piston that remains of the piston middle wall in the area of the recesses.

* * * * *